United States Patent
Kudo

(10) Patent No.: US 12,442,802 B2
(45) Date of Patent: Oct. 14, 2025

(54) ANALYSIS DATA PROCESSING DEVICE, ANALYSIS DEVICE, ANALYSIS DATA PROCESSING METHOD AND NON-TRANSITORY COMPUTER READABLE MEDIUM STORING EXAMINATION PROGRAM

(71) Applicant: SHIMADZU CORPORATION, Kyoto (JP)

(72) Inventor: Yukihiko Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 316 days.

(21) Appl. No.: 18/027,024

(22) PCT Filed: Sep. 29, 2020

(86) PCT No.: PCT/JP2020/036989
§ 371 (c)(1),
(2) Date: Mar. 17, 2023

(87) PCT Pub. No.: WO2022/070274
PCT Pub. Date: Apr. 7, 2022

(65) Prior Publication Data
US 2023/0366862 A1 Nov. 16, 2023

(51) Int. Cl.
*G01N 30/72* (2006.01)
(52) U.S. Cl.
CPC ................. *G01N 30/7206* (2013.01)
(58) Field of Classification Search
USPC ................................. 250/282, 281
See application file for complete search history.

(56) References Cited

U.S. PATENT DOCUMENTS

| 6,175,111 B1 * | 1/2001 | Sorita ................ G01N 30/7206 |
| | | 250/282 |
| 6,444,979 B1 | 9/2002 | Watanabe |

(Continued)

FOREIGN PATENT DOCUMENTS

| JP | 2000-035422 A | 2/2000 |
| JP | 2013-130411 A | 7/2013 |
| JP | 2021-89880 A | 6/2021 |

OTHER PUBLICATIONS

Marten Fischer et al., "Simultaneous Trace Identification and Quantification of Common Types of Microplastics in Environmental Samples by Pyrolysis-Gas Chromatography-Mass Spectrometry", Environmental Science & Technology, May 2, 2017, pp. 5052-5060, vol. 51, No. 9.

(Continued)

*Primary Examiner* — Kiet T Nguyen
(74) *Attorney, Agent, or Firm* — Sughrue Mion, PLLC

(57) ABSTRACT

An analysis data processing device includes an information producer that produces first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample, and an output controller that outputs the first information together with information of the detected substance.

21 Claims, 15 Drawing Sheets

(56) References Cited

U.S. PATENT DOCUMENTS

2011/0101215 A1* 5/2011 Hirabayashi ....... G01N 30/8675
                                                       250/281
2021/0175060 A1  6/2021 Kubo et al.
2022/0246412 A1* 8/2022 Quint .................. H01J 49/0009

OTHER PUBLICATIONS

E. Duemichen et al., "Automated Thermal Extraction-Desorption Gas Chromatography Mass Spectrometry: A Multifunctional Tool for Comprehensive Characterization of Polymers and Their Degradation Products" Journal of Chromatography A, May 10, 2019, pp. 133-142, vol. 1592.

W.R. Zeng et al., "Chemical Kinetics And Mechanism Of Polystyrene Thermal Decomposition," [online], 2007, International Association for Fire Safety Science, Internet URL: https://www.iafss.org/publications/aofst/7/128#>.

International Search Report for PCT/JP2020/036989 dated, Dec. 22, 2020 (PCT/ISA/210).

Written Opinion of the International Searching Authority for PCT/JP2020/036989 dated, Dec. 22, 2020 (PCT/ISA/237).

Communication dated Sep. 20, 2024 issued by the State Intellectual Property of the P.R.China in application No. 202080105671.8.

Communication dated Jul. 16, 2024 issued by the Japanese Patent Office in application No. 2022-553274.

Communication issued Feb. 19, 2025 in Chinese Application No. 202080105671.8.

Japanese Office Action dated Dec. 5, 2023 in Japanese Application No. 2022-553274.

Communication dated Mar. 5, 2025 issued by the Japanese Patent Office in application No. 2022-553274.

Communication dated Jun. 5, 2025 in Chinese Application No. 202080105671.8.

\* cited by examiner

FIG. 3

TABLE A : CONTENTS OF SUBSTANCE DB

| NAME OF FIRST SUBSTANCE | NAME OF SECOND SUBSTANCE | DETERMINATION CRITERION |
|---|---|---|
| A | 1<br>2<br>3 | DETECTION OF ALL COMPONENTS |
| B | 4<br>5 | DETECTION OF ALL COMPONENTS |
| C | 6<br>7<br>8<br>9 | DETECTION OF ALL COMPONENTS |

C11  C21  C31

F I G. 4   TABLE B: TABLE SHOWING RESULTS OF DETERMINATION

| NAME | FIRST SUBSTANCE | | | SECOND SUBSTANCE | | |
|---|---|---|---|---|---|---|
| | INCLUDED/ NOT INCLUDED | CONCENTRATION (mg/kg) | NAME | DETECTION | CONCENTRATION (mg/kg) |
| A | INCLUDED | 600 | 1 | ✓ | 100 |
| | | | 2 | ✓ | 100 |
| | | | 3 | ✓ | 400 |
| B | NOT INCLUDED | — | 4 | — | — |
| | | | 5 | — | — |
| C | NOT INCLUDED | — | 6 | ✓ | 100 |
| | | | 7 | ✓ | 100 |
| | | | 8 | — | — |
| | | | 9 | ✓ | 100 |
| C11 | C12 | C13 | C21 | C22 | C23 |

FIG. 7

TABLE C: TABLE SHOWING CONTENTS OF SUBSTANCE DB

| NAME OF FIRST SUBSTANCE | COUNT OF CORRESPONDING SECOND SUBSTANCES | NAME OF SECOND SUBSTANCE | DETERMINATION CRITERION 1 | DETERMINATION CRITERION 2 |
|---|---|---|---|---|
| A | 3 | 1, 2, 3 | DETECTION OF ALL COMPONENTS | |
| B | 2 | 4, 5 | DETECTION OF ALL COMPONENTS | |
| C | 4 | 6, 7, 8, 9 | DETECTION OF TWO OR MORE COMPONENTS | 6 IS EQUAL TO OR LARGER THAN 1 % OF ENTIRE C |

C11　C41　C21　C32　C33

FIG. 8
TABLE D: TABLE SHOWING RESULTS OF DETERMINATION

| FIRST SUBSTANCE ||| SECOND SUBSTANCE |||
| NAME OF FIRST SUBSTANCE | INCLUDED/ NOT INCLUDED | CONCENTRATION (mg/kg) | NAME OF SECOND SUBSTANCE | DETECTION | CONCENTRATION (mg/kg) |
| --- | --- | --- | --- | --- | --- |
| A | ✓ INCLUDED | 600 | 1 | ✓ | 100 |
|   |   |   | 2 | ✓ | 100 |
|   |   |   | 3 | ✓ | 400 |
| B | △ (PARTIALLY INCLUDED) | — | 4 | — | — |
|   |   |   | 5 | ✓ | 100 |
| C | ✓ INCLUDED | 300 | 6 | ✓ | 100 |
|   |   |   | 7 | ✓ | 100 |
|   |   |   | 8 | — | — |
|   |   |   | 9 | ✓ | 100 |
| C11 | C12 | C13 | C21 | C22 | C23 |

FIG. 9

TABLE E: TABLE SHOWING DETAILS OF RESULTS OF DETERMINATION

| NAME OF FIRST SUBSTANCE | COUNT OF DETECTED SECOND SUBSTANCES | RESULT OF DETERMINATION CRITERION 1 | RESULT OF DETERMINATION CRITERION 2 | INCLUDED/NOT INCLUDED |
|---|---|---|---|---|
| A | 3 | ✓ (3/3) | — | ✓ |
| B | 1 | — (1/2) | — | — (PARTIAL DETECTION) |
| C | 2 | ✓ (2/2) | ○ (RATE OF 6 IS 33 %) | ✓ |

TABLE F: TABLE SHOWING CONTENTS OF SUBSTANCE DB

| NAME OF FIRST SUBSTANCE | COUNT OF SECOND SUBSTANCES | NAME OF SECOND SUBSTANCE | DETERMINATION CRITERION 1 | DETERMINATION CRITERION 2 (PEAK HEIGHT RATIO) |
|---|---|---|---|---|
| A | 3 | 1, 2, 3 | DETECTION OF ALL COMPONENTS | 1:50±10%<br>2:25±10%<br>3:100%(BASE PEAK) |
| C11 | C41 | C21 | C32 | C33 |

FIG. 10B

TABLE G: TABLE SHOWING RESULTS OF DETECTION OF SECOND SUBSTANCES

| NAME OF SECOND SUBSTANCE | DETECTION | PEAK HEIGHT | PEAK HEIGHT RATIO (%) | DETERMINATION CRITERION 1 | DETERMINATION CRITERION 2 |
|---|---|---|---|---|---|
| 1 | ✓ | 1000 | 50 | ✓ | ✓ |
| 2 | ✓ | 300 | 15 | ✓ | ✓ |
| 3 | ✓ | 2000 | 100 | ✓ | ✓ |
| C21 | C22 | C61 | C62 | C51 | C52 |

F I G. 11

TABLE H: TABLE SHOWING CONTENTS OF SUBSTANCE DB

| NAME OF FIRST SUBSTANCE | COUNT OF SECOND SUBSTANCES | NAME OF SECOND SUBSTANCE | DETERMINATION CRITERION 1 | DETERMINATION CRITERION 2 |
|---|---|---|---|---|
| A | 3 | 1, 2, 3 | DETECTION OF ALL COMPONENTS | HIGHER DETECTION RATE THAN B |
| B | 3 | 1, 2, 4 | DETECTION OF TWO OR MORE COMPONENTS | HIGHER DETECTION RATE THAN A |

TABLE 1: TABLE SHOWING RESULTS OF DETERMINATION

| NAME OF FIRST SUBSTANCE | COUNT OF DETECTED SECOND SUBSTANCES | DETERMINATION CRITERION 1 | DETERMINATION CRITERION 2 | INCLUDED/ NOT INCLUDED |
|---|---|---|---|---|
| A | 3 | ✓ (3/3) | ✓ | ✓ |
| B | 2 | ✓ (2/3) | — | — (PARTIAL DETECTION) |
| C11 | C42 | C51 | C52 | C12 |

FIG. 13A

TABLE J: TABLE SHOWING CONTENTS OF SUBSTANCE DB

| NAME OF SECOND SUBSTANCE | NAME OF CORRESPONDING FIRST SUBSTANCE |
|---|---|
| 1 | A |
| 2 | A, B |
| 3 |  |
| 4 | A, C |
| 5 |  |
| 6 | C |
| 7 | C |
| 8 | B |

TABLE K: TABLE SHOWING RESULTS OF DETECTION OF SECOND SUBSTANCES

| NAME OF SECOND SUBSTANCE | DETECTION | CONCENTRATION |
|---|---|---|
| 1 | ✓ | 100 |
| 2 | ✓ | 100 |
| 3 | ✓ | 100 |
| 4 | — | — |
| 5 | ✓ | 100 |
| 6 | ✓ | 100 |
| 7 | — | — |
| 8 | ✓ | 100 |

C21, C22, C23

F I G. 14

TABLE L: TABLE SHOWING RESULTS OF DETERMINATION

| NAME | FIRST SUBSTANCE | | | SECOND SUBSTANCE | | |
|---|---|---|---|---|---|---|
| | INCLUDED/NOT INCLUDED | CONCENTRATION (mg/kg) | | NAME | DETECTION | CONCENTRATION (mg/kg) |
| A | △ (PARTIALLY INCLUDED) | — | | 1 | ∨ | 100 |
| | | | | 2 | ∨ | 100 |
| | | | | 4 | — | — |
| B | ∨ INCLUDED | 200 | | 2 | ∨ | 100 |
| | | | | 8 | ∨ | 100 |
| C | △ (PARTIALLY INCLUDED) | — | | 4 | — | — |
| | | | | 6 | ∨ | 100 |
| | | | | 7 | — | — |
| C11 | C12 | C13 | | C21 | C22 | C23 |

ANALYSIS DATA PROCESSING DEVICE, ANALYSIS DEVICE, ANALYSIS DATA PROCESSING METHOD AND NON-TRANSITORY COMPUTER READABLE MEDIUM STORING EXAMINATION PROGRAM

CROSS REFERENCE TO RELATED APPLICATIONS

This application is a National Stage of International Application No. PCT/JP2020/036989 filed Sep. 29, 2020.

TECHNICAL FIELD

The present invention relates to an analysis data processing device, an analysis device, an analysis data processing method and a non-transitory computer readable medium storing an examination program.

BACKGROUND ART

When whether a substance to be analyzed is included in a sample is derived, a plurality of different substances derived from the substance are detected in the analysis of the sample. In particular, since it is difficult to detect a polymer as it is because the polymer has a high molecular weight and is not easily dissolved, a product resulting from the decomposition or reaction of the polymer is detected. In Non-Patent Documents 1, 2 and 3, a plurality of different substances produced by pyrolytical decomposition of a polymer are detected by pyrolysis chromatography/mass spectrometry.

When the information in regard to whether a substance to be analyzed is included in a sample is obtained based on results of detection of a plurality of different substances as described above, an analyst or the like examines data on a case-by-case basis based on their knowledge about the substance. This may require the time or effort.

CITATION LIST

Non-Patent Document

[Non-Patent Document 1] Fischer M, Scholz-Bottcher M. "Simultaneous Trace Identification and Quantification of Common Types of Microplastics in Environmental Samples by Pyrolysis-Gas Chromatography-Mass Spectrometry" Environmental Science & Technology, (United States), American Chemical Society, May 2, 2017, Volume 51, Issue 9, pp. 5052 to 5060

[Non-Patent Document 2] Duemichen E, Eisentraut P, Celina M, Braun U. "Automated Thermal Extraction-Desorption Gas Chromatography Mass Spectrometry: A Multifunctional Tool for Comprehensive Characterization of Polymers and Their Degradation Products" Journal of Chromatography A, (Netherlands), Elsevier, May 10, 2019, Volume 1592, pp. 133-142

[Non-Patent Document 3] Zeng W R, Chow W K, Yao B. "Chemical Kinetics And Mechanism Of Polystyrene Thermal Decomposition," [online], 2007, International Association for Fire Safety Science, [searched on May 26, 2020], Internet URL: https://www.iafss.org/publications/aofst/7/128#>

SUMMARY OF INVENTION

Technical Problem

Thus, it is desirable that, in a case in which whether a substance to be analyzed is included in a sample is based on detection of a plurality of different substances derived from the substance, the information in regard to whether the substance to be analyzed is included in the sample is provided efficiently.

Solution to Problem

A first aspect of the present invention relates to an analysis data processing device including an information producer that produces first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample, and an output controller that outputs the first information together with information of the detected substance.

A second aspect of the present invention relates to an analysis device including the analysis data processing device of the first aspect.

A third aspect of the present invention relates to an analysis data processing method including producing first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample, and outputting the first information together with information of the detected substance.

A fourth aspect of the present invention relates to a non-transitory computer readable medium storing an examination program for causing a computer to execute an information producing process of producing first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample, and an output controlling process of outputting the first information together with information of the detected substance.

Advantageous Effects of Invention

With the present invention, in a case in which whether a substance to be analyzed is included in a sample is based on detection of a plurality of different substances derived from the substance, the information in regard to whether the substance to be analyzed is included in the sample can be provided efficiently.

BRIEF DESCRIPTION OF THE DRAWINGS

FIG. 3 is a table showing the contents of a substance database according to the one embodiment.

FIG. 4 is a table showing the results of determination according to the one embodiment.

FIG. 7 is a table showing the contents of a substance database according to a modified example.

FIG. 8 is a table showing the results of determination according to the modified example.

FIG. 9 is a table showing details of results of determination according to the modified example.

FIG. 10A is a table showing the contents of a substance database according to a modified example.

FIG. 10B is a table showing the results of detection of second substances.

FIG. 11 is a table showing the contents of a substance database according to a modified example.

FIG. 12 is a table showing the results of determination according to the modified example.

FIG. 13A is a table showing a substance database according to a modified example.

FIG. 13B is a table showing the results of detection of second substances according to the modified example.

FIG. 14 is a table showing the results of determination according to the modified example.

DESCRIPTION OF EMBODIMENTS

Embodiments of the present invention will be described below with reference to the drawings.

—Embodiment—

An analysis device of the present embodiment produces information in regard to whether a substance to be analyzed is included in a sample, based on data obtained in an analysis and data included in a substance database (DB). In the substance DB, a substance is associated with a plurality of substances that are included in the substance or produced by decomposition or reaction of the substance. In the following embodiment, the former substance is referred to as a first substance, and the latter substance is referred to as a second substance. It is preferable that a first substance is a mixture, a decomposition source substance or a reaction source substance. A second substance is preferably a component of a mixture or a substance produced by decomposition or reaction. A substance to be analyzed includes a first substance.

(Regarding Analysis Device)

Figure 1:
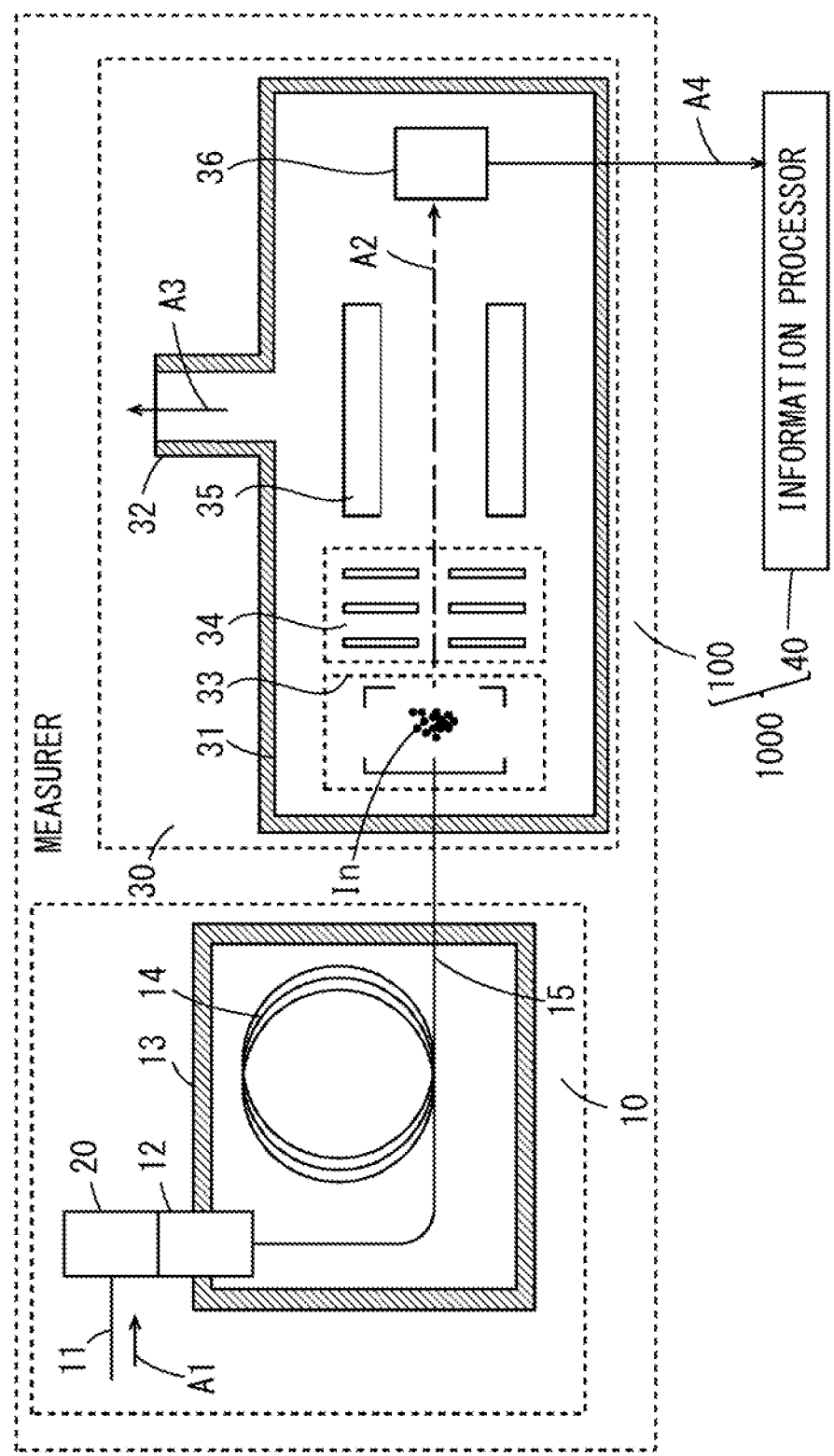
FIG. 1 is a conceptual diagram showing the configuration of an analysis device of one embodiment.

FIG. 1 is a conceptual diagram showing the configuration of the analysis device according to the present embodiment. The analysis device 1000 is a Pyrolysis-Gas Chromatograph-mass Spectrometer (Py-GC-MC) and includes a measurer 100 and an information processor 40. The measurer 100 includes a pyrolysis gas chromatograph 10 and a mass spectrometry unit 30.

The pyrolysis gas chromatograph 10 includes a pyrolysis apparatus 20, a carrier gas flow path 11, a sample introducer 12 into which a sample that is pyrolytically decomposed in the pyrolysis apparatus 20 is introduced, a column temperature adjuster 13, a separation column 14 and a sample gas introduction tube 15. The mass spectrometry unit 30 includes a vacuum container 31, an exhaust port 32, an ionizer 33 that ionizes a sample to produce sample-derived ions In, an ion adjuster 34, a mass separator 35 and a detector 36.

The measurer 100 separates a sample into components and detects each component.

As long as a sample may include a first substance to be analyzed, the sample is not limited in particular. In a case in which a sample is pyrolytically decomposed by the pyrolysis apparatus 20 as in the present embodiment, preparation of the sample does not require a special operation and is simple.

The pyrolysis gas chromatograph 10 pyrolytically decomposes a sample and then separates the sample into components using the separation column 14. A sample is gas or gaseous when being introduced into the separation column 14, and the gas or gaseous sample is referred to as a sample gas.

The carrier gas flow path 11 is a flow path for a carrier gas such as helium and introduces the carrier gas into the pyrolysis apparatus 20 (the arrow A1). The pyrolysis apparatus 20 pyrolytically decomposes a sample and introduces the sample into the sample introducer 12. The type of the pyrolysis apparatus 20 is not limited in particular, and may be a heating furnace type, an induction heating type or a filament type. The sample introducer 12 includes a chamber into which a sample is introduced, a split vent, etc. and introduces a sample gas suitably and selectively into the separation column 14.

The separation column 14 includes a column such as a capillary column. The temperature of the separation column 14 is controlled by the column temperature adjuster 13 including a column oven or the like such that the temperature of the separation column 14 is equal to or lower than several hundred ° C. Respective components into which a sample gas is separated in the separation column 14 are eluted from the separation column 14 at different times and introduced into the ionizer 33 of the mass spectrometry unit 30 through the sample gas introduction tube 15. In a case in which the separation column 14 is a capillary column, the capillary column and the sample gas introduction tube 15 may be integrated.

The mass spectrometry unit 30 includes a mass spectrometer, ionizes a sample introduced into the ionizer 33 and performs mass separation for detection. The path through which sample-derived ions In produced in the ionizer 33 flow is schematically indicated by the arrow A2. The sample-derived ion In includes ions obtained when an electron, an atom or an atomic group is bonded to a sample, or ions produced by dissociation or the like of a sample or sample-derived ion In.

As long as being able to detect sample-derived ions In in mass spectrometry with desired accuracy, the type of a mass spectrometer that is included in the mass spectrometry unit 30 is not limited in particular. A mass spectrometer that includes one or more mass spectrometry devices of any type can be used.

The vacuum container 31 of the mass spectrometry unit 30 includes an exhaust port 32. The exhaust port 32 is connected to a vacuum exhaust system (not shown) that includes a pump such as a turbo-molecular pump that can realize a high vacuum state equal to or lower than $10^{-2}$ Pa and its auxiliary pump. In FIG. 1, exhaust of gas in the vacuum container 31 is indicated schematically by the arrow A3.

The ionizer 33 of the mass spectrometry unit 30 includes an ion source and ionizes a sample that has been introduced into the ionizer 33. An ionization method performed by the ionizer 33 is not limited in particular as long as ionization can be performed with desired efficiency. In a case in which a Gas Chromatograph-Mass Spectrometer (GC-MS) is included as in the analysis device 1000 of the present embodiment, electron ionization, chemical ionization or the like can be used. Sample-derived Ions In produced in the ionizer 33 are introduced into the ion adjuster 34.

The ion adjuster 34 of the mass spectrometry unit 30 includes an ion transport system such as a lens electrode or an ion guide and makes adjustment by converging sample-derived ions In by electromagnetic action, etc. Sample-derived ions In emitted from the ion adjuster 34 are introduced into the mass separator 35.

The mass separator 35 of the mass spectrometry unit 30 includes a quadrupole mass filter and performs mass separation on the introduced sample-derived ions In. The mass separator 35 causes the sample-derived ions In to pass selectively in accordance with a value of the mass-to-charge ratio using a voltage applied to the quadrupole mass filter. The sample-derived ions In obtained by mass separation in the mass separator 35 enter the detector 36. In the following description, the term a "mass-to-charge ratio" is interpreted in a broad sense and is a parameter indicating the ratio of a mass to a charge, and m/z is used as its one example. However, a mass-to-charge ratio of a different unit or the like instead of m/z can also be used.

The detector 36 of the mass spectrometry unit 30 includes an ion detector and detects the entered sample-derived ions In. The detector 36 converts a detection signal obtained by detection of the entered sample-derived ions In into a digitalized signal by an Analog/Digital (A/D) converter (not shown) and outputs the digitalized detection signal to the information processor 40 (the arrow A4). Hereinafter, data including an intensity of a detection signal of sample-derived ions In obtained by an analysis operation performed in the measurer 100 is referred to as detection data.

The information processor 40 includes an information processing apparatus such as an electronic calculator and executes processes such as communication, storage or calculation in regard to various data in addition to serving as an interface with respect to a user of the analysis device 1000 (hereinafter simply referred to as a "user").

Figure 2:
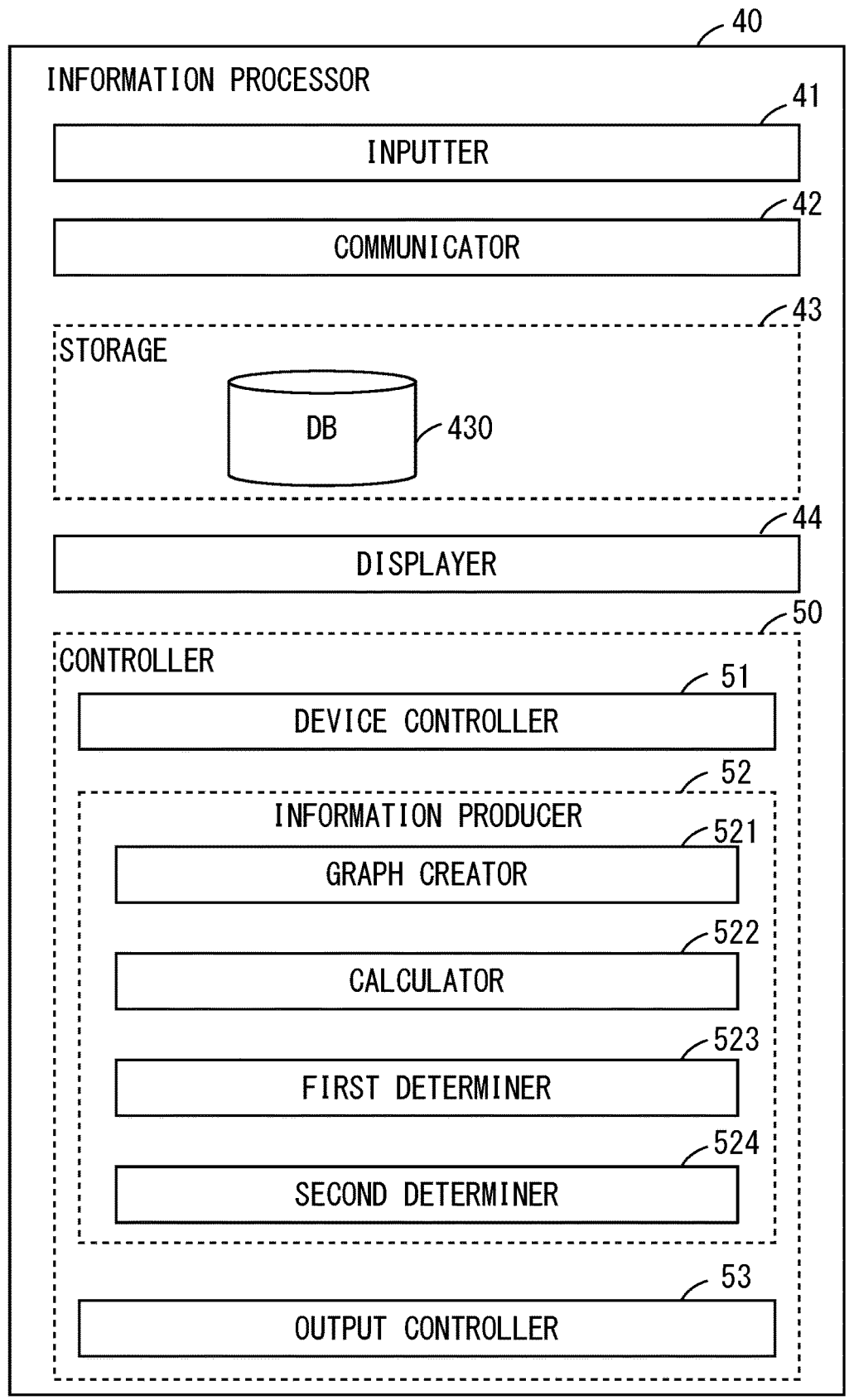
FIG. 2 is a conceptual diagram showing the configuration of an information producer of the analysis device of the one embodiment.

FIG. 2 is a conceptual diagram showing the configuration of the information processor 40. The information processor 40 includes an inputter 41, a communicator 42, a storage 43, a displayer 44 and a controller 50. The storage 43 includes the substance DB 430. The controller 50 includes a device controller 51, an information producer 52 and an output controller 53. The information producer 52 includes a graph creator 521, a calculator 522, a first determiner 523 and a second determiner 524. The information processor 40 functions as a device for processing data obtained in an analysis. Data obtained in an analysis is referred to as analysis data, and the analysis data includes the above-mentioned detection data.

The inputter 41 includes an input device such as a mouse, a keyboard, various buttons or a touch panel. The inputter 41 receives information required for a process executed by the controller 50 from the user. The communicator 42 includes a communication device that can communicate via wireless connection or wired communication such as the Internet, and suitably transmits and receives data and so on relating to a process executed by the controller 50.

The storage 43 includes a storage medium and stores a program and data for execution of a process by the controller 50. An examination program for execution of a process by the information producer 52, described below, is included in the program.

Part of data used by the analysis device 1000 may be saved in a remote server or the like, and at least part of a calculation process executed by the examination program may be executed in the remote server or the like.

The substance DB 430 of the storage 43 is a DB including substance data. In the substance data, a first substance is associated with a plurality of second substances that are included in the first substance or produced by decomposition or reaction of the first substance. In the following embodiments, when a plurality of datasets in the substance DB 430 are "associated with" or "correspond to" one another, it means that when one dataset is obtained, the other dataset can be referenced by a search through the substance DB 430.

In a case in which a plurality of second substances are included in a first substance, by way of example, the first substance is a mixture and the plurality of second substances are components included in the first substance. For example, 1,2-Benzenedicarboxylic acid, dipentyl ester (branched and linear, CAS No, 84777-06-0), which is a phthalate ester, includes three types of compounds which are Diisopentyl phthalate (CAS No. 605-50-5), N-pentyl-isopentylphthalate, (CAS No. 776297-69-9) and Dipentyl phthalate (CAS No. 131-18-0). It is desirable that whether 1,2-Benzenedicarboxylic acid, dipentyl ester (branched and linear) is included in a sample is determined based on the detection of the above-mentioned three types of compounds.

1,2-Benzenedicarboxylic acid, dipentyl ester (branched and linear), described above, and 1,2-Benzenedicarboxylic acid, di-C6-10-alkyl esters (CAS No. 68515-42-4) are subject to regulation in Europe and are mixtures of phthalate esters. In regard to the analysis data processing method according to the present embodiment, it is preferable that a first substance to be analyzed is a mixture of phthalate esters, and a second substance is each component of the mixture. A first substance included in the substance DB 430 can include any mixture as long as including a plurality of components detectable second substances.

Phthalate esters tend to be subject to regulation because of negative impact on living organisms, and an efficient quantitative analysis is highly important for quality management or the like of products. Thus, it is preferable that phthalate esters are subject to an analysis.

A non-limiting example in which a plurality of second substances are produced by decomposition or reaction of a first substance includes a case in which a first substance is a polymer and a second substance is part of the polymer. For example, in a case in which a first substance is polystyrene, a plurality of second substances may include a styrene monomer, a styrene dimer, a styrene trimer and the like. The substance DB 430 can include polyethylene, polypropylene, polystyrene, polyvinylchloride, polycarbonate, poly (methyl methacrylate) and polyamide 6 as first substances. In this case, second substances can include the products shown in the table 2 of the above-mentioned Non-Patent Document 1. In the present embodiment, a first substance to be analyzed can be a resin, in particular, a synthetic resin. In this case, the analysis data processing method according to the present embodiment is suitable for detecting microplastic in a sample. A non-limiting example in which a plurality of second substances are produced by reaction of a first substance can include a case in which derivatization is performed when second substances are produced from a first substance. A first substance included in the substance DB 430 can include any mixture as long as a plurality of substances detectable as second substances may be produced by decomposition or reaction.

FIG. 3 is a table A for explaining the contents of the substance DB 430. In the following table, it is assumed that the contents shown in the same row are associated with one another in the substance DB 430. In the table A, an item C11 for the name of a first substance, an item C21 for the name of a second substance and an item C31 for a determination criterion are shown. In the item C11 for the name of a first substance, the name of a first substance is shown. In the item C21 for the name of a second substance, the name of a second substance is shown. In the item C31 for a determination criterion, the determination criterion information is shown.

As shown in respective tables, described below, the below-mentioned output controller 53 can cause the displayer 44 to display respective items in association with one another. In other words, the following respective tables are examples of a display screen of the displayer 44. In this case, design in each diagram such as presence or absence of a vertical line or a horizontal line is not limited in particular.

The determination criterion information is the information representing to what extent each of a plurality of second substances associated with a first substance is detected for determination that the first substance is included in a sample. "Detection of all components" of the determination criterion information represents that, in a case in which all of a plurality of second substances corresponding to a certain first substance are detected in an analysis of a sample, it is determined that the first substance is included in the sample.

The substance DB 430 does not have to include determination criterion information. In this case, the information producer 52 may execute a process, described below, without depending on the type of a first substance. For example, it is assumed that "detection of all components" is set in regard to all of first substances.

In the substance DB 430, a plurality of second substances are associated with a first substance, and determination criterion information is further associated with a first substance. For example, a plurality of second substances "1," "2" and "3" are associated with a first substance "A." Further, "detection of all components" is associated with the first substance "A" as the determination criterion information. In the table A, the associations are indicated by partitioning of respective items with solid lines extending horizontally for each first substance.

In the substance DB 430, a first substance corresponding to one second substance may be included.

In the substance DB 430, the format, representation and the like of data are not limited in particular as long as the information producer 52 can execute a process, described below. For example, in regard to "detection of all components" of the determination criterion information, such a character string does not need to be stored in the substance DB 430, and a number or a symbol may represent "detection of all components." Reference numbers or the like may be used instead of the names of a first substance and a second substance. In the substance DB 430, data can be stored in association with each other with use of arrays or the like.

The table A and each of the following tables showing the contents of the substance DB 430 are for the sake of convenience for explaining the association among data sets in the substance DB 430. However, with the control of the output controller 53, as shown in the table A, a first substance and a plurality of second substances can be associated with each other, and the data of the substance DB 430 can be displayed by the displayer 44 in a table format. In this case, the output controller 53 can extract the data corresponding to a first substance to be analyzed from the substance DB 430 and cause the displayer 44 to display the data.

The displayer 44 is configured to include a display device such as a liquid crystal monitor. The displayer 44 displays the information and the like produced by the information producer 52 on a display device due to the control of the output controller 53.

The controller 50 includes a processor such as a CPU (Central Processing Unit) and a storage medium such as a memory. The processor operates as a main constituent of the analysis device 1000 by reading a program stored in the storage 43 or the like into a memory for execution, controlling the measurer 100, processing detection data, etc.

As long as the controller 50 can execute a process according to the present embodiment, the physical configuration of the controller 50 is not limited in particular.

The device controller 51 of the controller 50 controls an operation for an analysis to be performed (an analysis operation) by each element of the measurer 100. For example, the device controller 51 can detect sample-derived ions In in a scan mode in which the m/z of ions passing through the mass separator 35 changes continuously or an SIM (Selective Ion Monitoring) mode in which a plurality of sample-derived ions having a specific m/z are allowed to pass through the mass separator 35. In this case, the device controller 51 changes a voltage of the mass separator 35 such that sample-derived ions In having an m/z that is set based on input from the inputter 41, or the like, selectively pass through the mass separator 35.

The information producer 52 of the controller 50 produces information in regard to whether a first substance to be analyzed is included in a sample based on substance data and detection data. The information includes first substance determination information, described below.

The graph creator 521 of the information producer 52 creates data corresponding to a graph representing variations in intensity of a detection signal based on detection data. The graph creator 521 preferably creates at least one of chromatogram data which is the data corresponding to a chromatogram and mass spectrum data which is the data corresponding to a mass spectrum. A chromatogram is a graph in which the abscissa indicates a retention time, and the ordinate indicates the intensity of a detection signal for ions detected during each retention time. A mass spectrum is a graph in which the abscissa indicates an m/z of detected ions, and the ordinate indicates an intensity of a detection signal for ions having each m/z.

The calculator 522 of the information producer 52 calculates the intensities of detection signals of a plurality of second substances corresponding to a first substance to be analyzed. The calculator 522 acquires the information of a first substance to be analyzed, which is set based on input by the inputter 41. The calculator 522 refers to the substance DB 430 and acquires the information of a plurality of second substances corresponding to a first substance to be analyzed. The calculator 522 acquires the retention times and m/z of the second substances based on the information of the plurality of second substances acquired from the substance DB 430. The retention times and m/z may be stored in the substance DB 430 or acquired from another database. The calculator 522 refers to chromatogram data or mass spectrum data, and calculates the height or area of a peak corresponding to the retention time and m/z of each second substance. The calculator 522 causes the storage 43 or the like to store the calculated height or area of a peak as the detection intensity representing the magnitude of a detection signal of a second substance. The calculator 522 may calculate at least one of the sum and the average value of the detection intensities of a plurality of second substances corresponding to a first substance to be analyzed.

The calculator 522 can calculate the concentration of a second substance in a sample based on the detection intensity of the second substance with use of the detection intensity of a standard sample having a known concentration, or the like. The calculator 522 may calculate at least one of the sum and the average value of the concentrations of a plurality of second substances corresponding to a first substance to be analyzed. The calculation for the sum is particularly suitable for detection of a phthalate ester. For example, the concentration of 1,2-Benzenedicarboxylic acid, di-C6-10-alkyl esters which are subject to regulation in Europe is calculated as the sum of the concentrations of molecules having 6 to 10 branched and linear carbon atoms. In such a case, it is possible to accurately determine whether a corresponding first substance has a concentration subject to regulation by calculating the sum of the concentrations of a plurality of second substances.

The first determiner 523 of the information producer 52 determines whether a plurality of second substances associated with a first substance to be analyzed are included in a sample. Based on whether the detection intensity or the concentration of a second substance satisfies a condition based on a threshold value defined by the magnitude of noise or the like in an analysis of the sample, the first determiner 523 determines whether the second substance is included in a sample. For example, in a case in which the detection intensity of a second substance is equal to or higher than the above-mentioned threshold value, the first determiner 523 can determine that the second substance is included in the sample. Otherwise, the first determiner 423 can determine that the second substance is not included in the sample.

The first determiner 523 can represent an obtained result of determination with a binary value or the like and cause the storage 43 to store the result of determination in association with the name, the reference number, the concentration and the like of a second substance. Hereinafter, the information representing a result of determination in regard to whether the second substance is included in a sample is referred to as second substance determination information.

The second determiner 524 of the information producer 52 determines whether a first substance to be analyzed is included in a sample based on second substance determination information and determination criterion information. The second determiner 524 refers to the substance DB 430 and refers to the determination criterion information of a first substance to be analyzed. In a case in which "detection of all components" is set for the determination criterion information, when all of second substances corresponding to a first substance to be analyzed are included in a sample, the second determiner 524 determines that the first substance is included in the sample. When not all of the second substances corresponding to the first substance to be analyzed is included in the sample, the second determiner 524 determines that the first substance is not included in the sample.

The second determiner 524 can represent an obtained result of determination with a binary value or the like and cause the storage 43 to store the result of determination in association with the name, the reference number, the concentration and the like of the first substance. Hereinafter, the information representing a result of determination in regard to whether the first substance is included in a sample is referred to as first substance determination information.

FIG. 4 is a table B showing the results of determination made by the first determiner 523 and the second determiner 524. In order to represent the results of determination in regard to a first substance to be analyzed to the user, the table B may be displayed by the displayer 44 due to the control of the output controller 53, described below. In the table B, the item C11 for the name of a first substance, an item C12 for determination in regard to a first substance, an item C13 for the concentration of a first substance, the item C21 for the name of a second substance, an item C22 for determination in regard to a second substance and an item C23 for the concentration of a second substance are shown. In regard to the items that have already been explained such as the item C11 for the name of a first substance, the description will not be repeated since their contents are the same. The same applies to each of the following charts.

In the item C12 for determination in regard to a first substance, the contents of first substance determination information which is whether each first substance is included in a sample are shown. In the item C13 for the concentration of a first substance, the concentration of a first substance in a sample is shown. In the item C22 for determination in regard to a second substance, whether each second substance is included in a sample is shown. In the following table, in the item C22 for determination in regard to a second substance, a check mark is suitably shown in a case in which it is determined that each second substance is included in a sample, and a hyphen is suitably shown in a case in which it is determined that each second substance is not included in a sample. However, a method of displaying a result of determination in regard to a second substance is not limited in particular. In the item C23 for the concentration of a second substance, the concentration of a second substance is shown. The unit for the calculated concentration of each of a first substance and a second substance is not limited to mg/kg which is shown in the table.

Also in the following table, although a symbol such as a check mark, a hyphen or a circle is used to indicate a binary value such as presence or absence of detection, a display method is not limited in particular.

In the example of the table B, all of second substances 1 to 3 corresponding to a first substance A are detected, and the determination criterion in regard to the first substance A is "detection of all components" according to the table A (FIG. 3). Therefore, the second determiner 524 determines that the first substance A is included in the sample, and the result of determination is shown in the item C12 for determination in regard to a first substance. The determination criteria in regard to a first substance B and a first substance C are "detection of all components" according to the table A, and there are undetected second substances for the first substances B and C (4 and 5 for the first substance B, and 8 for the first substance C). Therefore, the second determiner 524 determines that the first substance B or C is not included in the sample, and the results of determination are shown in the item C12 for determination in regard to a first substance.

In the example of the table B, the concentration of the first substance A is shown as the sum of the concentrations of the plurality of second substances 1 to 3 corresponding to the first substance A. Since it is determined that the first substance B or C is not included in the sample, the concentrations are not shown in the item C13 for the concentration of a first substance.

With reference back to FIG. 2, the output controller 53 outputs the first substance determination information together with the information in regard to a plurality of second substances corresponding to a first substance to be analyzed by causing the displayer 44 to display the information on the display device or transmitting the information via the communicator 42 or the like. As shown in the table B, the output controller 53 can cause the displayer 44 to display the information in regard to whether a first substance to be analyzed is included in a sample and the information in regard to a plurality of second substances corresponding to the first substance in association with each other. Further, the output controller 53 can cause the displayer 44 to display the sum or the average value of the detection intensities or concentrations of a plurality of second substances as in the item C13 for the concentration of a first substance in the table B.

(Regarding Analysis Method)

Figure 5:
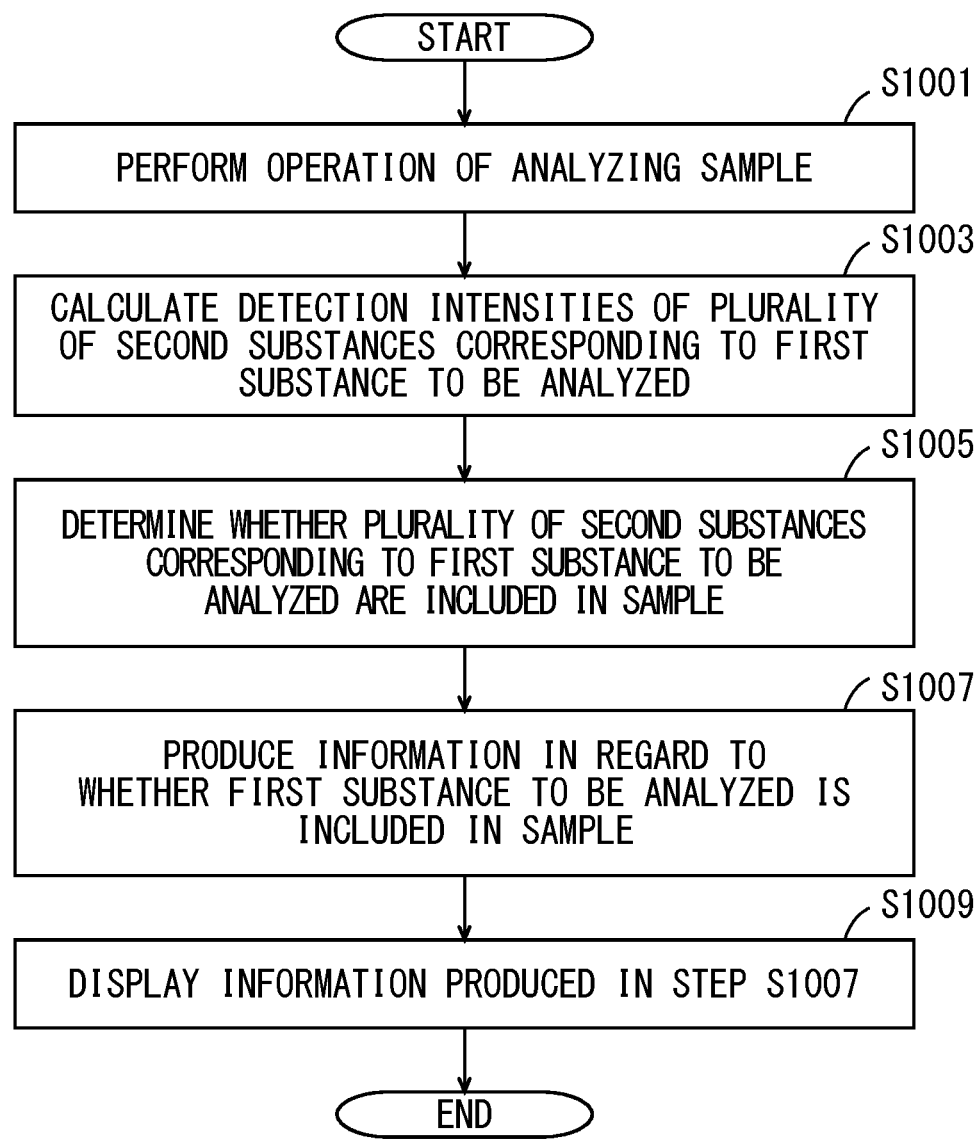
FIG. 5 is a flowchart showing a flow of an analysis method according to the one embodiment.

FIG. 5 is a flowchart showing a flow of an analysis method including the analysis data processing method according to the present embodiment. In the step S1001, the device controller 51 controls the measurer 100 and performs an operation of analyzing a sample. When the step S1001 ends, the step S1003 is started. In the step S1003, the calculator 522 calculates the detection intensities of a plurality of second substances corresponding to a first substance to be analyzed. When the step S1003 ends, the step S1005 is started.

In the step S1005, the first determiner 523 determines whether the plurality of second substances corresponding to the first substance to be analyzed are included in a sample. When the step S1005 ends, the step S1007 is started. In the step S1007, the second determiner 524 produces information in regard to whether the first substance to be analyzed is included in the sample. When the step S1007 ends, the step S1009 is started.

In the step S1009, the output controller 53 causes the displayer 44 to display the information produced in the step S1007. When the step S1009 ends, the process ends.

With the above-mentioned embodiment, the following effects are obtained.

(1) The analysis device 1000 of the present embodiment includes the information producer 52 that produces the first substance determination information based on the substance data and the detection data obtained in the detection of the second substances 1 to 3 in an analysis of the sample, and the output controller 53 that outputs the first substance determination information together with the information of the detected second substances 1 to 3. Here, in the substance data, the first substance A is associated with the plurality of second substances 1 to 3 that are included in the first substance A or produced by decomposition or reaction of the first substance A. Thus, in a case in which whether a substance to be analyzed is included in a sample is based on detection of a plurality of different substances derived from the substance, the information in regard to whether the substance to be analyzed is included in the sample can be provided efficiently.

(2) In the analysis device 1000 of the present embodiment, the substance data can include at least one of a resin and a phthalate ester as the first substances A to C, and the information producer 52 can produce first information in regard to whether at least one of a resin and a phthalate ester to be analyzed is included in the sample. In regard to a resin and a phthalate ester, whether the substance is included in a sample is often based on the detection of a plurality of different substances derived from the substance. Therefore, with the analysis device 1000, it is possible to provide information specially efficiently in regard to whether a resin or a phthalate ester is included in the sample.

(3) In the analysis device 1000 of the present embodiment, in the substance data, the determination criterion information is associated with the first substances A to C, and the information producer 52 produces the first substance determination information based on the determination criterion information. Thus, with use of a different determination criterion for each first substrate to be analyzed, it is possible to more accurately provide information in regard to whether the first substance is included in the sample.

(4) In the analysis device 1000 of the present embodiment, the output controller 53 can cause the displayer 44 to display at least one of the sum or the average of the concentrations of the plurality of second substances 1 to 3 and the sum or the average of the detection intensities of the plurality of second substances 1 to 3, the plurality of second substances 1 to 3 being detected in an analysis of the sample, together with the first substance determination information. Thus, the quantitative information in regard to the first substance can be provided to the user.

Following modifications are in the scope of the present invention and can be combined with the above-mentioned embodiment. In the below-mentioned modified examples, parts having structure and functions similar to those of the above-mentioned embodiment are denoted with the same reference numerals, and a description will suitably be not repeated.

Modified Example 1

While a sample is analyzed by Pyrolysis-Gas Chromatography/Mass Spectroscopy (Py-GC/MS) in the above-mentioned embodiment by way of example, the type of the analysis is not limited in particular as long as the sample can be separated into components for detection. An analysis of a sample can include mass spectrometry, chromatography and chromatography/mass spectrometry. As non-limiting examples, an analysis of a sample can include pyrolysis gas chromatography, thermal extraction/desorption gas chromatography, pyrolysis gas chromatography/mass spectrometry and thermal extraction/desorption gas chromatography/mass spectrometry. Here, in the thermal extraction/desorption gas chromatography, gas including a sample component obtained by heating of a sample is adsorbed by an adsorbent, and then the sample component obtained by desorption by heating of the adsorbent is subjected to gas chromatography. Refer to Non-Patent Documents 1 and 2 for details.

From a similar point of view, an analysis device that analyzes a sample can include a mass spectrometer, a chromatograph and a chromatograph-mass spectrometer. As non-limiting examples, the analysis device can include a pyrolysis gas chromatograph, a thermal desorption gas chromatograph, a thermal extraction/desorption gas chromatograph, a pyrolysis gas chromatograph-mass spectrometer, a thermal desorption gas chromatograph-mass spectrometer and a thermal extraction/desorption gas chromatograph-mass spectrometer.

While one stage of mass separation is performed in the above-mentioned embodiment, two or more stages of mass separation may be performed. A dissociation method is not limited in particular, and collision-induced dissociation or the like can be used.

Modified Example 2

In the above-mentioned embodiment, it is assumed that, when the first substance determination information is displayed by the displayer 44, a screen element, corresponding to a first substance, such as the name of the first substance displayed on the screen, is clicked. At this time, the output controller 53 can cause the displayer 44 to display a graph or a calculated value obtained in an analysis of a sample in regard to a plurality of second substances corresponding to the first substance.

Figure 6A:
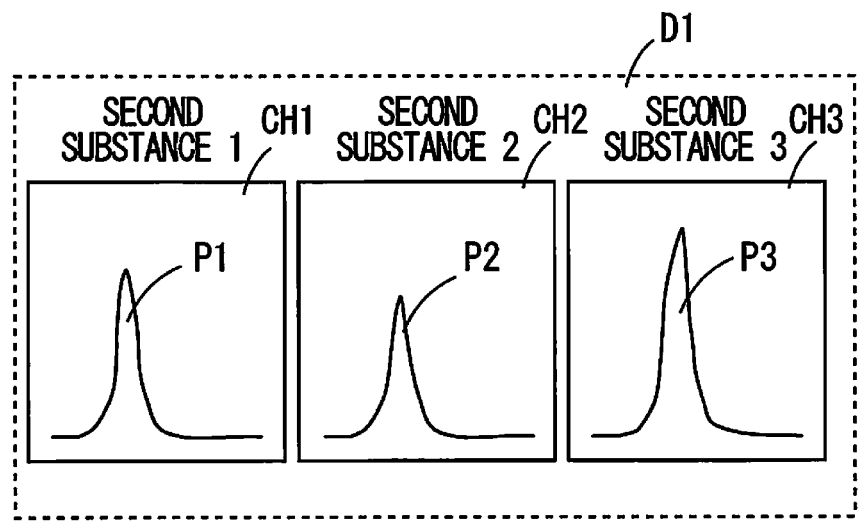
FIG. 6A is a diagram showing one example of screen elements according to a modified example.
Figure 6B:
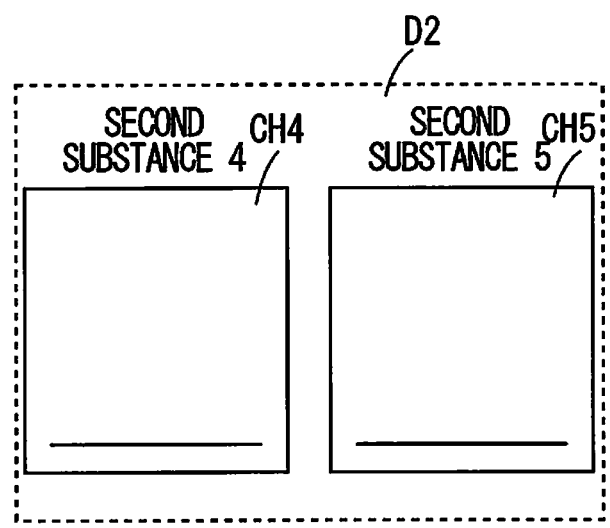
FIG. 6B is a diagram showing one example of screen elements according to the modified example.

FIGS. 6A and 6B are the conceptual diagrams showing an example of the display screen in the present modified example. When the screen element corresponding to the first substance is clicked, a first screen element D1 is displayed by the displayer 44. The first screen element D1 includes chromatograms CH1, CH2 and CH3 corresponding to the second substances 1, 2 and 3, respectively. The second substances 1, 2 and 3 correspond to the first substance A in the substance DB 430 (see FIG. 4). The second substances 1, 2 and 3 are all detected in an analysis of a sample. The chromatograms CH1, CH2 and CH3 include a peak P1 of the second substance 1, a peak P2 of the second substance 2 and a peak P3 of the second substance 3, respectively.

A second screen element D2 includes chromatograms CH4 and CH5 corresponding to second substances 4 and 5, respectively. The second substances 4 and 5 correspond to the first substance B in the substance DB 430. None of the second substances 4 and 5 is detected in the analysis of the sample (see FIG. 4). Therefore, peaks of the second substances 4 and 5 are not shown in the chromatograms CH4 and CH5, respectively.

In this manner, the graph, the calculated value or the like obtained in an analysis can be displayed in a simple manner, so that the user can easily obtain detailed information as necessary.

In this manner, the graph, the calculated value or the like obtained in an analysis can be displayed in a simple manner, so that the user can easily obtain detailed information as necessary.

Any action, such as placing a mouse cursor on the name of a first substance, in addition to clicking, taken with respect to the screen element corresponding to the first substance can start the display of the first screen element D1 and the second screen element D2. Alternatively or additionally, mass spectra may be displayed in the chromatograms CH1 to CH5. The first screen element D1 and the second screen element D2 may be superimposed in the screen showing the results of determination and the like as shown in the table B, or only the first screen element D1 or the second screen element D2 may be displayed on the display screen.

In the analysis device 1000 of the present modified example, when the user takes action with respect to the screen element corresponding to the first substance A to be analyzed on the screen displaying the first substance determination information, the output controller 53 causes the displayer 44 to display at least one of the graph and the calculated value obtained in the analysis in regard to the plurality of second substances 1 to 3 associated with the first substance. Thus, the more detailed information in regard to the detection of the second substances 1 to 3 can be provided to the user in a simple manner.

Modified Example 3

While "detection of all components" is set for the determination criterion information in regard to all of the first substances in the table A of the above-mentioned embodiment, the invention is not limited to this. Various conditions can be set.

FIG. 7 is a table C for explaining the contents of the substance DB 430 in the present modified example. In the table C, the item C11 for the name of a first substance, an item C41 for the count of second substances, the item C21 for the name of a second substance, an item C32 for a first determination criterion and an item C33 for a second determination criterion are shown. In the item C21 for the count of second substances, the count of a plurality of corresponding second substances is shown for each first substance. In the item C32 for a first determination criterion and the item C33 for a second determination criterion, the determination criterion information is shown. As with the first substance C in the table C, a plurality of conditions can be set as determination criteria in regard to one first substance.

In regard to the determination criterion for the first substance C, the determination criterion 1 is that two or more second substances out of the four second substances 6 to 9 are detected, and the determination criterion 2 is that the ratio of the second substance 6 with respect to the entire first substance C is equal to or larger than 1% by weight. In the present modified example, in a case in which both of the determination criterion 1 and the determination criterion 2 are satisfied, the second determiner 524 determines that the first substance C is included in the sample. However, how conditions of a plurality of determination criteria are combined is not limited in particular. For example, when the count of satisfied determination criteria is equal to or larger than an arbitrary number, the second determiner 524 can determine that a first substance is included in a sample. The information in regard to how to combine the conditions of such determination criteria can also be set for each first substance in the substance DB 430.

FIG. 8 is a table D showing the results of determination made by the first determiner 523 and the second determiner 524 in the present modified example. In the table D, the item C11 for the name of a first substance, the item C12 for determination in regard to a first substance, the item C13 for the concentration of a first substance, the item 21 for the name of a second substance, the item C22 for determination in regard to a second substance and the item C23 for the concentration of a second substance are shown. In regard to the first substance B corresponding to the two second substances 4 and 5, although the second substance 4 is not detected, the second substance 5 is detected. Since the determination criterion for the first substance B is "detection of all components," the second determiner 524 determines that the first substance B is not included in the sample. In the table D, in the item C12 for determination in regard to a first substance, it is shown that part of the corresponding second substances is included in the sample in regard to the first substance B. In the item C12 for determination in regard to a first substance in the present modified example, even in a case in which it is determined that a first substance is not included in the sample, when part of the corresponding second substances is detected, it can be shown that part of the second substances is detected in the first substance determination information.

In regard to the first substance C, since three (6, 7, 9) out of the corresponding four second substances 6 to 9 are detected, the determination criterion 1 ("detection of two or more components" in the table C) is satisfied. While the concentration of the first substance is 300 mg/kg, the concentration of the second substance 6 is 100 mg/kg, which is equal to or larger than 1%. Therefore, the determination criterion 2 is also satisfied. Therefore, as shown in the item C12 for determination in regard to a first substance, the second determiner 524 produces the first substance determination information representing that the first substance C is included in the sample.

FIG. 9 is a table E showing the results of determination by the first determiner 523 and the second determiner 524 in the present modified example in more details. In the table E, the item C11 for the name of a first substance, an item C42 for the count of detections, an item C51 for a first result, an item C52 for a second result and the item C12 for determination in regard to a first substance are shown. In the item C42 for the count of detections, the count of detected corresponding second substances is shown. In the item C51 for a first result, a result in regard to the determination criterion 1 is shown. In the item C52 for a second result, a result in regard to the determination criterion 2 is shown.

In the item C51 for a first result, a check mark is shown in a case in which the determination criterion 1 is satisfied, and a hyphen is shown in a case in which the determination criterion 1 is not satisfied. In the item C51 for a first result, the count of a plurality of second substances corresponding to a first substances is shown in the right portion in the parentheses, and the count of detected second substances out of the count of the second substances is shown in the left portion in the parentheses. As shown in the table E, the output controller 53 can cause the displayer 44 to display the count of second substances included in a sample out of a plurality of second substances corresponding to a first substance.

In the item C52 for second determination, a result of the determination criterion 2 is shown. Because the determination criterion 2 is not set for the first substances A and B, no information is displayed. In regard to the first substance C, satisfaction of the determination criterion 2 is indicated by ○, and the quantitative information in regard to the determination criterion 2 is mentioned in the parentheses. Here, based on the determination criterion 2, the ratio of the concentration of the second substance 6 with respect to the concentration of the first substance C is shown. In this manner, when the relative amounts of the concentrations of a plurality of second substances corresponding to a first substance to be analyzed are in a predetermined range, the information producer 52 produces the first substance determination information representing that the first substance is included in a sample. In this case, the second determiner 524 may make determination based on whether the concentration of a second substance is in the predetermined range instead of the relative amount of concentration.

In the present modified example, in a case in which the predetermined count of second substances corresponding to a first substance to be analyzed is detected, the information producer 52 produces the first substance determination information representing that the first substance is included in the sample. However, in a case in which a specific substance out of a plurality of second substances corresponding to a first substance to be analyzed is detected, or in a case in which the specific substance is detected at a predetermined ratio, the information producer 52 may produce the first substance determination information representing that the first substance is included in the sample. As the specific substance, it is preferable that a substance having high detectability in an analysis of a sample, a substance that is stably detected, or the like is used from the viewpoint of more accurate detection of a first substance to be analyzed.

In the analysis device 1000 of the present modified example, the output controller 53 causes the displayer 44 to display the count of detected second substances out of corresponding second substances for each first substance. Thus, the information in regard to the results of detection of the plurality of second substances corresponding to the first substance to be analyzed can be provided in a simple manner.

Modified Example 4

In the modified example 3, the second determiner 524 may determine whether a first substance is included in a sample based on whether the relative amounts of detection intensities of a plurality of second substances corresponding to the first substance are in a predetermined range, instead of the relative amount of concentration.

The determination may be made based on whether not the relative amount but the absolute amount of detection intensity is in a predetermined range.

FIG. 10A is a table F for explaining the contents of the substance DB 430 in the present modified example. In the table F, the item C11 for the name of a first substance, the item C41 for the count of second substances, the item C21 for the name of a second substance, the item C32 for a first determination criterion and the item C33 for a second determination criterion are shown. In the present modified example, the determination criterion 2 is that the ratio of the detection intensities of a plurality of second substances corresponding to a first substance A is in a predetermined range. Although the peak height of a chromatogram is used as a detection intensity in the present modified example, the peak area or the like may be used as long as the magnitude of a detection signal is quantitatively indicated. In the determination criterion 2, the peak of a second substance 3 is set as a base peak serving as a basis. The ratio of the peak height of a second substance 1 with respect to the peak height of the base peak is defined as a peak height ratio of the second substance 1. The ratio of the peak height of the second substance 2 with respect to the peak height of the base peak is defined as a peak height ratio of the second substance 2. In the present modified example, the condition of the determination criterion 2 is that the peak height ratio of the second substance 1 is in the range of 40% to 60%, and the peak height ratio of the second substance 2 is in the range of 15% to 35%.

FIG. 10B is a table G showing whether each second substance corresponding to the first substance A satisfies the determination criterion in the present modified example. In the table G, the item C21 for the name of a second substance, the item C22 for determination in regard to a second substance, an item C61 for a detection intensity, an item C62 for a relative detection intensity, the item C51 for a first result and the item C52 for a second result are shown. In the example of the table G, the peak height ratio of the second substance 1 is 50%, and the peak height ratio of the second substance 2 is 15%. It means that the determination criterion 2 (table F) is satisfied. Since both of the determination criterion 1 and the determination criterion 2 are satisfied, the second determiner 524 determines that the first substance A is included in the sample. The result of determination is not shown in the table G. In this manner, the determination criterion is set with use of the detection intensity such as a peak height or the relative amounts of the detection intensities of a plurality of second substances, whereby the information producer 52 can more flexibly determine whether a first substance is included in a sample.

Modified Example 5

In the above-mentioned embodiment, a certain second substance may correspond to a plurality of first substances in the substance DB 430. In this case, the information producer 52 can produce first substance determination information representing that only part of first substances out of a plurality of first substances corresponding to a second substance is included. The second determiner 524 can select one or more first substances out of the plurality of first substances that correspond to the certain second substance and satisfy the determination criterion, determine that the one or more selected first substances are included in a sample, and determine that the rest of the first substances is not included in the sample.

FIG. 11 is a table H showing the contents of the substance DB 430 of the present modified example. In the table H, the item C11 for the name of a first substance, the item C41 for the count of second substances, an item C21 for the name of a second substance, the item C32 for a first determination criterion and the item C33 for a second determination criterion are shown. In the example of the table H, a first substance A and a second substance B are both associated with second substances 1 and 2. In regard to the determination criterion 2, it is set that one of the first substance A and the first substance B having a higher detection rate is included in a sample, and that the other one of the first substance A and the first substance B having a lower detection rate is not included in the sample. Here, the detection rate is the rate of the count of detected second substances with respect to the count of a plurality of second substances corresponding to a first substance. Here, in regard to the information for the determination criterion 2, determination criterion information pieces, which are "having a higher detection rate than the first substance B" and "having a higher detection rate than the first substance A," correspond to the first substances A and B, respectively. In this case, the information for the determination criterion 2 may be stored in the substance DB 430 in association with the common second substance 1 or 2.

FIG. 12 is a table I showing the results of determination made by the second determiner 524 in the present modified example. In the table I, the item C11 for the name of a first substance, the item C42 for the count of detections, the item C51 for a first result, an item C52 for a second result and the item C12 for determination in regard to a first substance are shown. In the table I, as shown in the item C51 for a first result, three second substances corresponding to the first substance A are detected, and two second substances corresponding to the first substance B are detected. The first substances A and B both satisfy the determination criterion 1 (table H). Here, in regard to the first substance A, three out of the corresponding three second substances are detected, and the detection rate is 100%. In regard to the first substance B, two out of the corresponding three second substances are detected, and the detection rate is 67%. Since the detection rate of the first substance A is higher than the detection rate of the first substance B, the second determiner 524 determines that the first substance A is included in the sample, and determines that the first substance B is not included in the sample.

In this manner, in the analysis device 1000 in the present modified example, in a case in which the plurality of first substances A and B are associated with the common second substances 1 and 2, the information producer 52 selects part of the plurality of first substances A and B as the first substance included in the sample and produces the first substance determination information. Thus, in a case in which part of the plurality of first substances A and B having the common second substances 1 and 2 is included, the composition of the sample can be derived more accurately. Here, the second determiner 524 can select the first substance A included in the sample from the plurality of first substances A and B based on the count or the detection rate of the detected second substances for each first substance.

Modified Example 6

In the above-mentioned embodiment, a plurality of corresponding second substances are stored in association with one another in the substance DB 430 for each first substance. However, each second substance may be stored in association with the corresponding first substance in the substance DB 430.

FIG. 13A is a table J showing the contents of the substance DB 430 in the present modified example. In the table J, the item C21 for the name of a second substance, and the item C11 for the name of a first substance are shown. As shown in the table J, in the substance DB 430, a corresponding first substance is associated with each second substance. A certain second substance such as second substances 2 and 4 may correspond to a plurality of first substances. A certain second substance such as second substances 1, 6, 7 and 8 may correspond to one first substance. Further, a second substance such as second substances 3 and 5 may not correspond to a first substance. In this case, the output controller 53 can extract a second substance corresponding to a first substance to be analyzed and causes the displayer 44 to display a first substance corresponding to each second substance.

Based on an input or the like via the inputter 41, the output controller 53 is preferably configured to be capable of switching between displaying a plurality of second substances being associated with one first substance as shown in the table A and displaying a plurality of first substances being associated with one second substance as shown in the table J. Thus, the contents of the substance DB 430 can be displayed appropriately in accordance with the information or the like required by the user.

FIG. 13B is a table K showing the results of detection in regard to second substances. In the table K, the item C21 for the name of a second substance, the item C22 for determination in regard to a second substance and the item C23 for the concentration of a second substance are shown. As shown in the table K, the output controller 53 can cause the displayer 44 to display the results of detection of the second substances which are the results of determination made by the first determiner 523.

FIG. 14 is a table L showing the results of determination made by the first determiner 523 and the second determiner 524 in the present modified example. In the table L, the item C11 for the name of a first substance, the item C12 for determination in regard to a first substance, the item C13 for the concentration of a first substance, the item 21 for the name of a second substance, the item C22 for determination in regard to a second substance and the item C23 for the concentration of a second substance are shown. As shown in the table L, the output controller 53 can extract a plurality of corresponding second substances from the substance DB 430 for each first substance to be analyzed, and can cause the displayer 44 to display the results of detection of the extracted second substances in association with the first substance.

Modified Example 7

In the above-mentioned embodiment, the output controller 53 can cause the displayer 44 to display a notification in a case in which part of a plurality of second substances corresponding to a first substance to be analyzed is detected and the remaining second substances are not detected in an analysis of a sample. While a notification method performed by the output controller 53 is not limited in particular, a notification may be displayed as a pop-up message on the screen of the displayer 44, for example. In determination in regard to whether a second substance is included in a sample, the result may vary depending on noise in data obtained by an analysis, the shape of a peak of a chromatogram or the like. Therefore, in a case in which part of a plurality of second substances corresponding to a first substance is detected as described above, it is preferable that the user is notified and the user confirms the presence or absence of detection in regard to the remaining second substances in more detail in order to enhance the accuracy of determination.

Modified Example 8

A program for implementing an information processing function of the analysis device 1000 may be recorded in a computer-readable recording medium. A computer system may read the program, which is recorded in the recording medium, in regard to the control of a process to be executed by the above-mentioned information producer 52 and its related processes and execute the program. A "computer system" here includes hardware such as an OS (Operating System) or peripheral appliances. Further, a "computer-readable recording medium" refers to a movable recording medium such as a flexible disc, an optical magnetic disc, an optical disc or a memory card and a storage device such as a hard disc or a Solid State Drive (SSD) built into the computer system. Further, a "computer-readable recording medium" may include an object that retains a program dynamically for a short period of time such as a communication wire that is used when a program is transmitted through a network such as the Internet or a communication line such as a telephone line, or an object that retains a program for a certain period of time such as a volatile memory in a computer system that serves as a server or a client. Further, the above-mentioned program may be to implement part of the above-mentioned functions and may further be to implement the above-mentioned functions by being combined with a program that has already been recorded in the computer system.

Figure 15:
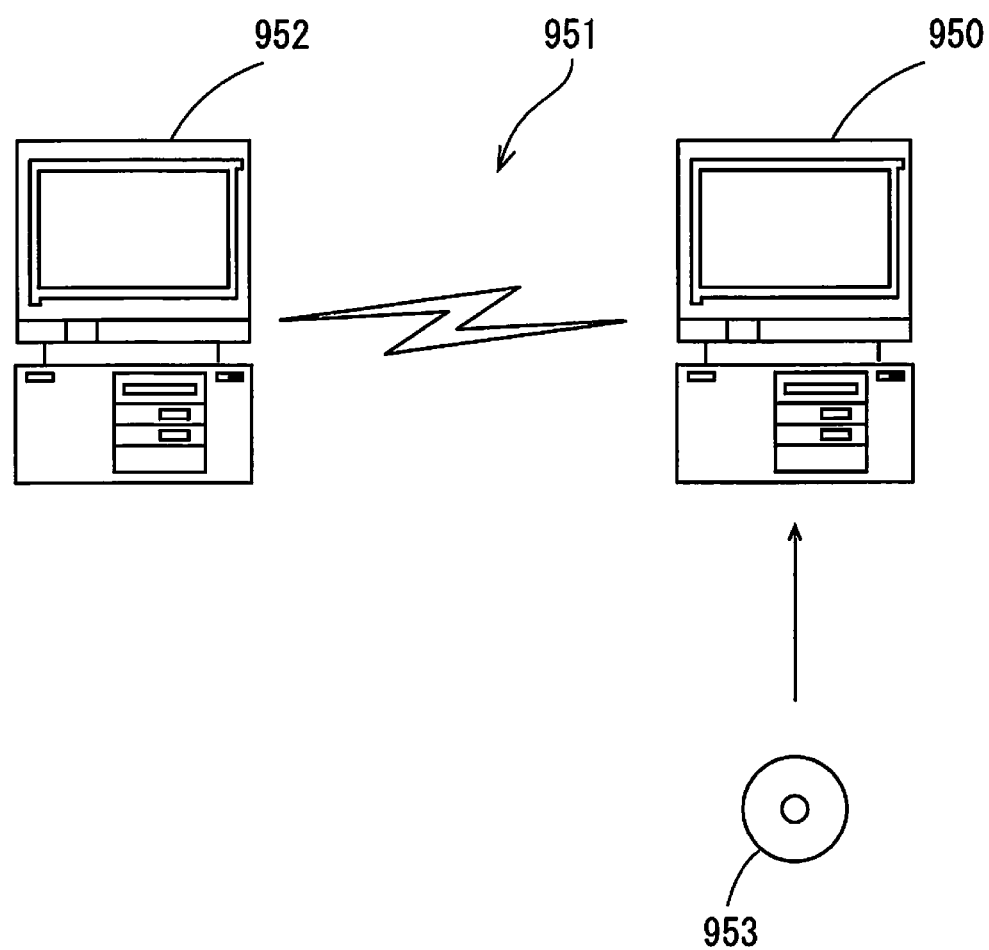
FIG. 15 is a conceptual diagram for explaining provision of an examination program.

Further, in a case where being applied to a personal computer (hereinafter referred to as a PC), the program relating to the above-mentioned control can be provided via a recording medium such as a CD-ROM or a DVD-ROM, or a data signal such as the Internet. FIG. 15 is a diagram showing the above-mentioned provision. A PC 950 receives a program via a CD-ROM 953. Further, the PC 950 has a function of being connected to a communication line 951.

The computer 952 is a server computer that provides the above-mentioned program and stores the program in a recording medium such as a hard disc. The communication line 951 is a communication line such as the Internet or a personal computer communication, or a dedicated communication line. The computer 952 reads a program with the use of a hard disc and transmits the program to the PC 950 through the communication line 951. That is, the program is transported by a carrier wave as a data signal and transmitted through the communication line 951. In this manner, the program can be provided as a computer-readable computer program product in various forms such as a recording medium or a carrier wave.

Aspects

It is understood by those skilled in the art that the plurality of above-mentioned illustrative embodiments or modified examples are specific examples of the below-mentioned aspects.

(Item 1) An analysis data processing device according to one aspect includes an information producer that produces first information (first substance determination information) in regard to whether a first substance to be analyzed is included in a sample based on first data (substance data) in which a first substance and a plurality of second substances included in the first substance or produced by decomposition or reaction of the first substance are associated with each other and second data (detection data) obtained by detection of a second substance in an analysis of the sample, and an output controller that outputs the first information together with information of the detected substance. Thus, in a case in which whether a substance to be analyzed is included in a sample is based on detection of a plurality of different substances derived from the substance, it is possible to efficiently provide the information regard to whether the substance to be analyzed is included in the sample.

(Item 2) The analysis data processing device according to another aspect, wherein the first data includes at least one of a resin and a phthalate ester as the first substance, and the information producer produces the first information in regard to whether at least one of a resin and a phthalate ester to be analyzed is included in the sample, in the analysis data processing device according to the aspect of item 1. In regard to a resin and a phthalate ester, whether a substance is included in a sample is often based on detection of a plurality of different substances derived from the substance. Therefore, with the present aspect, it is possible to particularly efficiently provide the information in regard to whether a substance to be analyzed is included in a sample.

(Item 3) The analysis data processing device according to another aspect, wherein the first data includes a synthetic resin as the first substance, and the information producer produces the first information in regard to whether microplastic is included in the sample, in the analysis data processing device according to the aspect of item 2. Thus, it is possible to efficiently provide the information in regard to whether microplastic that has been particularly problematic in recent years is included in a sample.

(Item 4) The analysis data processing device according to another aspect, wherein the analysis includes at least one of mass spectrometry, chromatography, pyrolysis-gas chromatography, thermal extraction/desorption chromatography, chromatography/mass spectrometry, pyrolysis-gas chromatography/mass spectrometry and thermal extraction/desorption chromatography/mass spectrometry, in the analysis data processing device of the aspect of any one of items 1 to 3. Thus, even in a case in which a sample includes various types of molecules, it is possible to separate these molecules to correctly detect second substances.

(Item 5) The analysis data processing device according to another aspect, wherein in the first data, second information (determination criterion information) is associated with the first substance, the information producer produces the first information based on the second information, and the second information represents to what extent each of the plurality of second substances associated with the first substance is detected for determination that the first substance is included in the sample, in the analysis data processing device of the aspect of any one of items 1 to 4. Thus, it is possible to more accurately provide the information in regard to whether a substance is included in a sample by using a different determination criterion for each substance to be analyzed.

(Item 6) The analysis data processing device according to another aspect, wherein the information producer produces the first information representing that the first substance to be analyzed is included in the sample in a case in which a predetermined count of the plurality of second substances associated with the first substance to be analyzed is detected, in the analysis data processing device of the aspect of any one of items 1 to 5. Thus, it is possible to more accurately provide the information in regard to whether a substance is included in a sample in association with the substance to be analyzed.

(Item 7) The analysis data processing device according to another aspect, wherein the information producer produces the first information representing that the first substance to be analyzed is included in the sample in a case in which a specific substance out of the plurality of second substances associated with the first substance to be analyzed is detected or in a case in which the specific substance is detected at a predetermined ratio, in the analysis data processing device of the aspect of any one of items 1 to 5. Thus, it is possible to more accurately provide the information in regard to whether a substance to be analyzed is included in a sample by using the characteristics of a specific substance.

(Item 8) The analysis data processing device according to another aspect, wherein the information producer produces the first information representing that the first substance to be analyzed is included in the sample when at least one of concentrations, detection intensities, relative amounts of the concentrations and relative amounts of the detection intensities is in a predetermined range, in the analysis data processing device of the aspect of any one of items 1 to 7. Thus, it is possible to more accurately provide the information in regard to whether a substance to be analyzed is included in a sample by using quantitative data.

(Item 9) The analysis data processing device according to another aspect, wherein the information producer selects part of the plurality of first substances as the first substance included in the sample in a case in which a plurality of the first substances are associated with the common second substance, in the analysis data processing device of the aspect of any one of items 1 to 8. Thus, when any of a plurality of first substances is selectively included in a sample, etc., it is possible to more accurately provide the information in regard to whether a substance to be analyzed is included in a sample.

(Item 10) The analysis data processing device according to another aspect, wherein the information producer selects the first substance included in the sample from among the plurality of first substances based on a count or ratio of the detected second substances in the plurality of second substances respectively associated with the plurality of first substances, in the analysis data processing device of the aspect of item 9. Thus, when any of a plurality of first substances is selectively included in a sample, etc., it is possible to select a substance having a high possibility of being included in the sample and more accurately provide the information in regard to whether a substance to be analyzed is included in the sample.

(Item 11) The analysis data processing device according to another aspect, wherein the information producer produces the first information representing that the first substance to be analyzed is included in the sample in a case in which a predetermined count of conditions out of a plurality of conditions is satisfied in regard to a result of the analysis performed on the plurality of second substances associated with the first substance to be analyzed, in the analysis data processing device of the aspect of any one of items 1 to 10. Thus, it is possible to more flexibly set a condition and more accurately provide the information in regard to whether a substance to be analyzed is included in a sample.

(Item 12) The analysis data processing device according to another aspect, wherein the output controller controls a display device such that the display device is switchable between displaying a plurality of the second substances being associated with one first substance and displaying a plurality of the first substances being associated with one second substance, in the analysis data processing device of the aspect of any one of items 1 to 11. Thus, it is possible to appropriately display the information in regard to a substance to be analyzed in accordance with the information required by the user, or the like.

(Item 13) The analysis data processing device according to another aspect, wherein the output controller causes a display device to display a count of the plurality of detected second substances out of the plurality of corresponding second substances for each first substance, in the analysis data processing device of the aspect of any one of items 1 to 12. Thus, it is possible to provide specific information in a simple manner in regard to the results of detection of a plurality of second substances corresponding to a first substance to be analyzed.

(Item 14) The analysis data processing device according to another aspect, wherein the output controller causes a display device to display at least one of a graph and a calculated value obtained in the analysis in regard to the plurality of second substances associated with the first substance when a user takes action with respect to a screen element corresponding to the first substance to be analyzed in the first information, in the analysis data processing device of the aspect of any one of items 1 to 13. Thus, it is possible to provide more detailed information in regard to the detection of a second substance to the user in a simple manner.

(Item 15) The analysis data processing device according to another aspect, wherein the graph is a chromatogram or a mass spectrum, in the analysis data processing device of the aspect of item 14. Thus, the user can observe the waveform of the peak of a second substance, or the like, and obtain more detailed information in regard to the detection of the second substance.

(Item 16) The analysis data processing device according to another aspect, wherein the output controller causes a display device to display at least one of, a sum or an average of concentrations of the plurality of second substances, and a sum or an average of detection intensities of the plurality of second substances together with the first information, in the analysis data processing device of the aspect of any one of items 1 to 15. Thus, it is possible to provide quantitative information in regard to the amount of a first substance included in a sample.

(Item 17) The analysis data processing device according to another aspect, wherein the output controller causes a display device to display a notification in a case in which part of the plurality of second substances associated with the first substance to be analyzed is detected and remaining part of the plurality of second substances associated with the first substance to be analyzed is not detected in the analysis, in the analysis data processing device of the aspect of any one of items 1 to 16. Thus, it is possible to provide the information in regard to an undetected second substance to the user in an easy-to-understand manner.

(Item 18) An analysis device according one aspect includes the analysis data processing device according to any one of items 1 to 17. Thus, in a case in which whether a substance to be analyzed is included in a sample is based on detection of a plurality of different substances derived from the substance, it is possible to efficiently provide the information regard to whether the substance to be analyzed is included in the sample.

(Item 19) The analysis device according to another aspect, wherein the analysis device includes at least one of a mass spectrometer, a chromatograph, a pyrolysis-gas chromatograph, a thermal desorption gas chromatograph, a thermal extraction/desorption gas chromatograph, a chromatograph/mass spectrometer, a pyrolysis-gas chromatograph/mass spectrometer and a thermal desorption gas chromatograph-mass spectrometer and a thermal extraction/desorption gas chromatograph-mass spectrometer, in the analysis device of the aspect of item 18. Thus, even in a case in which a sample includes various types of molecules, it is possible to separate these molecules to correctly detect second substances.

(Item 20) An analysis data processing method according to one aspect includes producing first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample; and outputting the first information together with information of the detected substance. Thus, in a case in which whether a substance to be analyzed is included in a sample is based on detection of a plurality of different substances derived from the substance, it is possible to efficiently provide the information regard to whether the substance to be analyzed is included in the sample.

(Item 21) A non-transitory computer readable medium storing an examination program according to one aspect, the examination program causing a computer to execute an information producing process (corresponding to the step S1007 of the flowchart of FIG. 5) of producing first information (first substance determination information) in regard to whether a first substance to be analyzed is included in a sample based on first data (substance data) in which a first substance and a plurality of second substances included in the first substance or produced by decomposition or reaction of the first substance are associated with each other and second data (detection data) obtained by detection of a second substance in an analysis of the sample, and an output controlling process (corresponding to the step S1009) of outputting the first information together with information of the detected substance. Thus, in a case in which whether a substance to be analyzed is included in a sample is based on detection of a plurality of different substances derived from the substance, it is possible to efficiently provide the information regard to whether the substance to be analyzed is included in the sample.

The present invention is not limited to the contents of the above-mentioned embodiment. Other aspects considered in the scope of technical idea of the present invention are also included in the scope of the present invention.

The invention claimed is:

1. An analysis data processing device comprising:
   an information producer that produces first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample; and
   an output controller that outputs the first information together with information of the detected substance.

2. The analysis data processing device according to claim 1, wherein
   the first data includes at least one of a resin and a phthalate ester as the first substance, and
   the information producer produces the first information in regard to whether at least one of a resin and a phthalate ester to be analyzed is included in the sample.

3. The analysis data processing device according to claim 2, wherein
   the first data includes a synthetic resin as the first substance, and
   the information producer produces the first information in regard to whether microplastic is included in the sample.

4. The analysis data processing device according to claim 1, wherein
   the analysis includes at least one of mass spectrometry, chromatography, pyrolysis-gas chromatography, thermal extraction/desorption chromatography, chromatography/mass spectrometry, pyrolysis-gas chromatography/mass spectrometry and thermal extraction/desorption chromatography/mass spectrometry.

5. The analysis data processing device according to claim 1, wherein
in the first data, second information is associated with the first substance,
the information producer produces the first information based on the second information, and
the second information represents to what extent each of the plurality of second substances associated with the first substance is detected for determination that the first substance is included in the sample.

6. The analysis data processing device according to claim 1, wherein
the information producer produces the first information representing that the first substance to be analyzed is included in the sample in a case in which a predetermined count of the plurality of second substances associated with the first substance to be analyzed is detected.

7. The analysis data processing device according to claim 1, wherein
the information producer produces the first information representing that the first substance to be analyzed is included in the sample in a case in which a specific substance out of the plurality of second substances associated with the first substance to be analyzed is detected or in a case in which the specific substance is detected at a predetermined ratio.

8. The analysis data processing device according to claim 1, wherein
the information producer produces the first information representing that the first substance to be analyzed is included in the sample when at least one of concentrations, detection intensities, relative amounts of the concentrations and relative amounts of the detection intensities is in a predetermined range.

9. The analysis data processing device according to claim 1, wherein
the information producer selects part of the plurality of first substances as the first substance included in the sample in a case in which a plurality of the first substances are associated with the common second substance.

10. The analysis data processing device according to claim 9, wherein
the information producer selects the first substance included in the sample from among the plurality of first substances based on a count or ratio of the detected second substances in the plurality of second substances respectively associated with the plurality of first substances.

11. The analysis data processing device according to claim 1, wherein
the information producer produces the first information representing that the first substance to be analyzed is included in the sample in a case in which a predetermined count of conditions out of a plurality of conditions is satisfied in regard to a result of the analysis performed on the plurality of second substances associated with the first substance to be analyzed.

12. The analysis data processing device according to claim 1, wherein
the output controller controls a display device such that the display device is switchable between displaying a plurality of the second substances being associated with one first substance and displaying a plurality of the first substances being associated with one second substance.

13. The analysis data processing device according to claim 1, wherein
the output controller causes a display device to display a count of the plurality of detected second substances out of the plurality of corresponding second substances for each first substance.

14. The analysis data processing device according to claim 1, wherein
the output controller causes a display device to display at least one of a graph and a calculated value obtained in the analysis in regard to the plurality of second substances associated with the first substance when a user takes action with respect to a screen element corresponding to the first substance to be analyzed in the first information.

15. The analysis data processing device according to claim 14, wherein
the graph is a chromatogram or a mass spectrum.

16. The analysis data processing device according to claim 1, wherein
the output controller causes a display device to display at least one of, a sum or an average of concentrations of the plurality of second substances, and a sum or an average of detection intensities of the plurality of second substances together with the first information.

17. The analysis data processing device according to claim 1, wherein
the output controller causes a display device to display a notification in a case in which part of the plurality of second substances associated with the first substance to be analyzed is detected and remaining part of the plurality of second substances associated with the first substance to be analyzed is not detected in the analysis.

18. An analysis device comprising the analysis data processing device according to claim 1.

19. The analysis device according to claim 18, wherein the analysis device includes at least one of a mass spectrometer, a chromatograph, a pyrolysis-gas chromatograph, a thermal desorption gas chromatograph, a thermal extraction/desorption gas chromatograph, a chromatograph/mass spectrometer, a pyrolysis-gas chromatograph/mass spectrometer and a thermal desorption gas chromatograph-mass spectrometer and a thermal extraction/desorption gas chromatograph-mass spectrometer.

20. An analysis data processing method including:
producing first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample; and
outputting the first information together with information of the detected substance.

21. A non-transitory computer readable medium storing an examination program for causing a computer to execute:
an information producing process of producing first information in regard to whether a first substance to be analyzed is included in a sample based on first data in which a first substance and a plurality of second substances included in the first substance or produced by decomposition or reaction of the first substance are associated with each other and second data obtained by detection of a second substance in an analysis of the sample; and an output controlling process of outputting the first information together with information of the detected substance.

\* \* \* \* \*